US010960893B2

(12) United States Patent
Chowdhury et al.

(10) Patent No.: US 10,960,893 B2
(45) Date of Patent: Mar. 30, 2021

(54) SYSTEM AND METHOD FOR DRIVER PROFILING CORRESPONDING TO AUTOMOBILE TRIP

(71) Applicant: Tata Consultancy Services Limited, Mumbai (IN)

(72) Inventors: Arijit Chowdhury, Kolkata (IN); Avik Ghose, Kolkata (IN); Tapas Chakravarty, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 524 days.

(21) Appl. No.: 15/878,857

(22) Filed: Jan. 24, 2018

(65) Prior Publication Data

US 2018/0237026 A1 Aug. 23, 2018

(30) Foreign Application Priority Data

Feb. 23, 2017 (IN) .............................. 201721006435

(51) Int. Cl.
*G07C 5/00* (2006.01)
*B60W 40/09* (2012.01)
*G01C 21/32* (2006.01)
*G01C 21/26* (2006.01)
*G01S 19/14* (2010.01)

(52) U.S. Cl.
CPC ............. *B60W 40/09* (2013.01); *G01C 21/26* (2013.01); *G01C 21/32* (2013.01); *G07C 5/008* (2013.01); *B60W 2520/06* (2013.01); *B60W 2520/105* (2013.01); *B60W 2520/125* (2013.01); *B60W 2556/60* (2020.02); *G01S 19/14* (2013.01)

(58) Field of Classification Search
CPC ............. B60W 40/09; B60W 2556/60; B60W 2520/06; B60W 2520/105; B60W 2520/125; G01C 21/32; G01C 21/26; G07C 5/008; G01S 19/14
See application file for complete search history.

(56) References Cited

U.S. PATENT DOCUMENTS 9,269,202 B2 2/2016 Phelan et al.
9,423,269 B2 * 8/2016 Miljkovic .......... G01C 21/3697
(Continued)

*Primary Examiner* — Masud Ahmed
(74) *Attorney, Agent, or Firm* — Finnegan, Henderson, Farabow, Garrett & Dunner, LLP

(57) ABSTRACT

This disclosure relates generally to driver profiling, and more particularly to system and method for driver profiling corresponding to automobile trip. In one embodiment, the method includes selectively computing, based on GPS data captured during a trip, features such that a first set of features are computed at a computation device and a second set of features are computed at a cloud server. The first and second set of features differs in computational complexity level. Said features include statistical data for attributes computed from the GPS data. The features corresponding to the trip are stored at repository associated with the cloud server. The repository includes previously precomputed features data associated with a set of driver profiles for previously completed trips. A driver profile corresponding to the trip is identified from amongst the set of driver profiles based on comparison of the plurality of features and the previously computed features data.

18 Claims, 5 Drawing Sheets

(56) References Cited

U.S. PATENT DOCUMENTS

| | | | |
|---|---|---|---|
| 2012/0209634 A1* | 8/2012 | Ling | G06Q 10/0833 705/4 |
| 2013/0006674 A1* | 1/2013 | Bowne | H04W 4/40 705/4 |
| 2014/0358326 A1* | 12/2014 | Phelan | G07C 5/02 701/1 |
| 2016/0357188 A1* | 12/2016 | Ansari | G06K 9/00805 |
| 2016/0357262 A1* | 12/2016 | Ansari | G06Q 10/0833 |
| 2016/0358477 A1* | 12/2016 | Ansari | G06Q 30/0251 |

* cited by examiner

SYSTEM AND METHOD FOR DRIVER PROFILING CORRESPONDING TO AUTOMOBILE TRIP

PRIORITY CLAIM

This U.S. patent application claims priority under 35 U.S.C. § 119 to: India Application No. 201721006435, filed on Feb. 23, 2017. The entire contents of the aforementioned application are incorporated herein by reference.

TECHNICAL FIELD

This disclosure relates generally to identification of driver profiles, and more particularly to a system and method for driver profiling using GPS data associated with automobile trip.

BACKGROUND

Intelligent transportation systems are considered as the advanced applications that provide novel services relating to traffic management and a convenient use of transport networks. Among various other applications, an application in ensuring driving safety through driving behavior analysis has received wide attention. Driving safety bears a direct co-relation with the driver's normal and abnormal driving behaviors, thus many systems for detecting driver's driving behavior have been developed and are widely used. These systems usually include detection of a driver's physiological signal(s), such as the movement of the driver's head, the changes in the driver's heartbeat, the moving track of the steering wheel, the driver's eye movement and the like.

The inventors here have recognized several technical problems with such conventional driver's driving behavior detecting system, systems, as explained below. Said systems relies on multiple sensors for collection of sensor data therefrom, which can then be utilized for detecting driving behavior. Examples of such sensors includes, but are not limited to, accelerometer sensors, gyroscope sensors, vehicle speed capturing sensors, location capturing sensors, weather capturing sensors, and so on. Due to dependence on multitude of sensors for driver behavior detection and profiling, the conventional systems render the process driver profiling computationally intensive and time consuming.

SUMMARY

Embodiments of the present disclosure present technological improvements as solutions to one or more of the above-mentioned technical problems recognized by the inventors in conventional systems. For example, in one embodiment, a processor implemented method for profiling corresponding to an automobile trip is provided, where the method includes selectively computing, based on GPS data captured during a trip, via a first hardware processor and a second hardware processor, a plurality of features. Selectively computing includes computing a first set of features from the plurality of features at a computation device and a second set of features from the plurality of features at a cloud server. The first set and the second set of features differs in a computational complexity level. The plurality of features includes statistical data for a plurality of attributes computed from the GPS data associated with the trip. Further, the method includes storing the plurality of features corresponding to the trip at a repository associated with the cloud server, via the first hardware processor and the second hardware processor, the repository further comprising previously computed features data associated with a set of driver profiles for a plurality of completed trips. Furthermore the method includes identifying, from amongst the set of driver profiles, a driver profile corresponding to the trip based on a comparison of the plurality of features and the previously computed features data, via the first hardware processor and the second hardware processor.

In another embodiment, a system for driver profiling corresponding to an automobile trip is provided. The system includes a first memory associated with a computation device and a second memory associated with a cloud server for storing instructions; and a first hardware processor coupled to the first memory and a second hardware processor coupled to the second memory, wherein said first and second hardware processors are configured by said instructions to selectively compute, based on GPS data captured during a trip, a plurality of features, wherein selectively computing comprises computing a first set of features from the plurality of features at the computation device and a second set of features from the plurality of features at the cloud server. The first set and the second set of features differs in a computational complexity level, the plurality of features comprising statistical data for a plurality of attributes computed from the GPS data associated with the trip. Further, the first hardware processor and the second hardware processor are configured by said instructions to store the plurality of features corresponding to the trip at a repository associated with the cloud server. The repository further includes previously computed features data associated with a set of driver profiles for a plurality of completed trips. Furthermore, the first hardware processor and the second hardware processor are configured by said instructions to identify, from amongst the set of driver profiles, a driver profile corresponding to the trip based on a comparison of the plurality of features and the previously computed features data.

In yet another embodiment, a non-transitory computer-readable medium having embodied thereon a computer program for executing a method for driver profiling corresponding to an automobile trip is provided. The method includes selectively computing, based on GPS data captured during a trip, via a first hardware processor and a second hardware processor, a plurality of features. Selectively computing includes computing a first set of features from the plurality of features at a computation device and a second set of features from the plurality of features at a cloud server. The first set and the second set of features differs in a computational complexity level. The plurality of features includes statistical data for a plurality of attributes computed from the GPS data associated with the trip. Further, the method includes storing the plurality of features corresponding to the trip at a repository associated with the cloud server, via the first hardware processor and the second hardware processor, the repository further comprising previously computed features data associated with a set of driver profiles for a plurality of completed trips. Furthermore the method includes identifying, from amongst the set of driver profiles, a driver profile corresponding to the trip based on a comparison of the plurality of features and the previously computed features data, via the first hardware processor and the second hardware processor.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
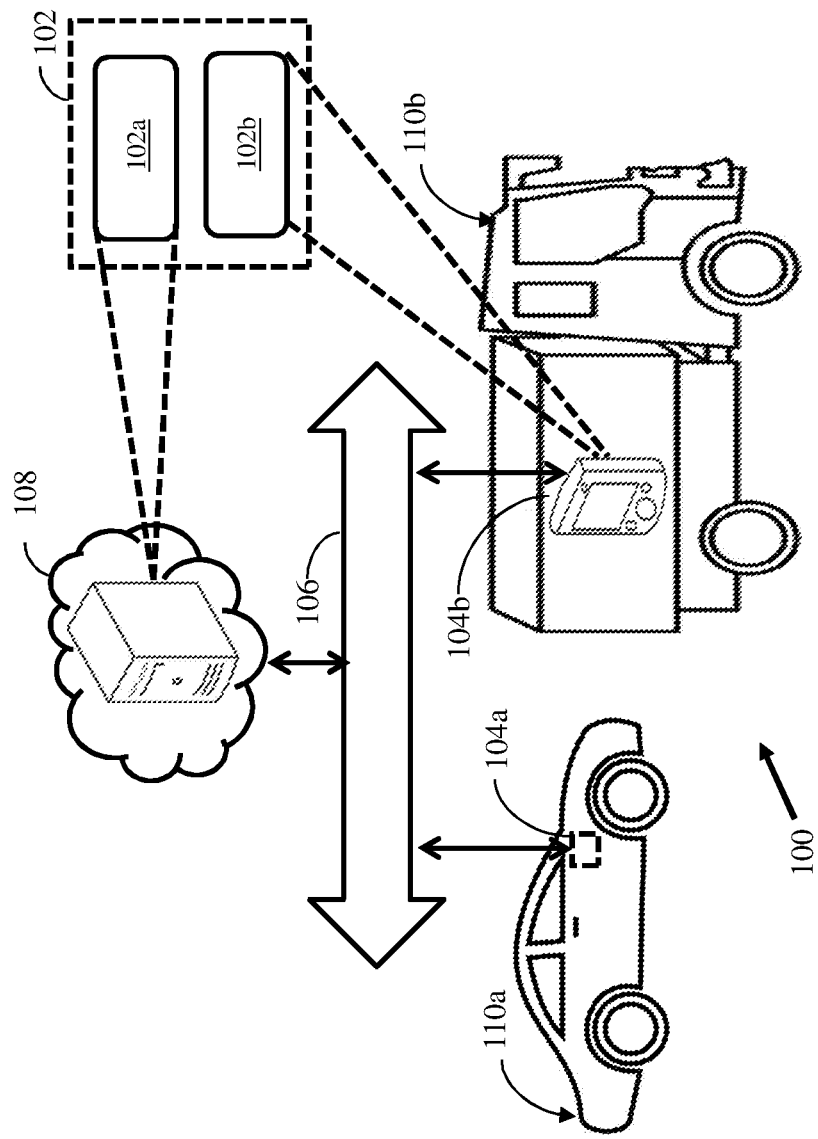
FIG. 1 illustrates a network implementation of a system for driver profiling corresponding to an automobile trip, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Current intelligent transportation systems incorporate embedded sensors and computational means for performance optimization of automobiles. For better performance and maintenance of automobiles, identifying the driver and his/her natural tendency i.e. unique driving style is important. For advanced driver assistance systems, identifying the driver is crucial. Conventionally, driver identification is achieved by using few numbers of dedicated sensors. The conventional approach for driver identification utilizes machine learning on data collected from a list of sensors. Examples of such sensors includes brake pedal position sensor, steering wheel angle sensor, lateral acceleration sensor, Yaw rate, Gear shift lever, vehicle speed, estimated gear sensor, Shaft angle velocity sensor, Accelerator pedal sensor, engine RPM sensor (OBD II), fuel consumption rate, throttle position, turn angle sensor, and so on.

The aforementioned sensors are embodied in the automobile to capture sensor data and identify driver based on said sensor data. However, being external to the automobile, said sensors imposes additional cost. Moreover, deployment of multiple sensors increases operational and maintenance overhead for the automobile. Also, installing and communicating with sensors results in additional overheads. The conventional systems have additional logistics cost associated with them, which in turn limits the rapid and large scale deployment thereof.

Another alternative conventional system includes biometric identification of the driver. However, none of the aforementioned conventional driver identification systems can be considered as viable solutions due to direct privacy violation. In addition, said conventional systems can intentionally avoided by the drivers/users. Moreover, in order to identify unique driving style of a driver, the identification of the driver may not be necessary. For example, the current systems determine when particularly identified drifts from his/her own driving style. However said determination is not helpful in identifying typical driving style of the driver.

In the light of foregoing problems, there exists a need for a system and a method that can provide an effective solution for driving behaviour analysis in order to generate a driving behaviour of a driver that can effectively overcome the deficiencies and technical limitations described hereinabove. Further, there also exists a need for a system and a method that can efficiently compute a driving score with minimum requirement of sensors to sense multiple parameters of a moving vehicle.

The disclosed embodiments overcome the shortcomings mentioned above by utilizing only logged GPS data (i.e. data collected from GPS sensor when the automobile is in motion, or during a trip of the automobile), and processing said GPS data to identify a driver profile from a plurality of driver profiles. Herein, the term 'driver profile' refers to various parameters captured corresponding to driving behaviour of a driver. In an embodiment, the plurality of driver profiles includes driving behaviour for those drivers that may be associated with an automobile. For instance, for a personal automobile or a family automobile, three to four driver profiles may be associated with the automobile. However, for a commercial automobile 10-15 driver profiles may be associated with the automobile as these many drivers may be driving that particular automobile at different times.

Additionally, the embodiments disclose methods for computation such that the computation/processing of the data is split between a remote server and a computation device on-board the automobile, so as to achieve a computationally efficient system.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The methods and systems are not limited to the specific embodiments described herein. In addition, the method and system can be practiced independently and separately from other modules and methods described herein. Each device element/module and method can be used in combination with other elements/modules and other methods.

The manner, in which the system and method for driver profiling shall be implemented, has been explained in details with respect to the FIGS. 1 through 5. While aspects of described methods and systems for driver profiling can be implemented in any number of different systems, utility environments, and/or configurations, the embodiments are described in the context of the following exemplary system(s).

Referring now to FIG. 1, a network implementation 100 of system 102 for driver profiling for an automobile trip is illustrated, in accordance with an embodiment of the present subject matter. In various embodiments, the system 102 facilitates in identifying a driver profile and/or driving behavior of a driver of an automobile, for example, automobile 110a, 110b corresponding to a trip. Herein, the term 'trip' may refer to a continuous journey from start time instant to stopping time instant, for reaching a destination.

Herein, the system 102 is caused to identify the driver profile primarily on the basis of GPS data captured during the trip. The GPS data may include a plurality of attributes such as a primary data, a derived data and multiple derivatives of the primary data and the derived data. The primary data may include data that can be directly captured using the GPS data. For example, the primary data may include speed, acceleration and course associated with the trip. The derived data may include data associated with lateral acceleration, angular speed, and jerk energy of the trip. The term 'jerk' may refer to rate of change of acceleration of the automobile. The term 'Jerk energy' may refer to energy of jerk signal in one second time window. The jerk energy may be computed by sum of square of five consecutive jerks around that time. The multiple derivatives of the primary data and the derived data may include a first derivative or difference of the primary and/or the derived data, the second derivative or difference of the primary and/or the derived data, and so on.

Herein, it will be noted that although the present subject matter is explained considering that the system 102 is implemented for driver profiling for an automobile trip, it may be understood that the system 102 may is not restricted to any particular machine or environment. The system 102 can be utilized for a variety of domains as well as for data where data with high computational load and complexity is involved. In an embodiment, the system 102 may be distributed between the cloud sever, for example, a cloud server 108 and a GPS logging device that may be on-board the automobile. For example, a system 102a may be embodied in the cloud server, and a system 102b may be installed in the on-board GPS logging device. The system 102a and the system 102b may be collectively referred to as the system 102.

The system 102 may be implemented in a variety of computing systems, such as a laptop computer, a desktop computer, a notebook, a workstation, a mainframe computer, a server, a network server, and the like. The system 102a may receive the GPS data from multiple devices such as one or more GPS logging devices and/or machines 106a 106b, and so on, collectively referred to as GPS devices 104 hereinafter. Examples of the GPS devices 104 may include, but are not limited to, GPS tracker, a portable computer, a personal digital assistant, a handheld device, a workstation, GPS sensor embodying devices, as storage devices equipped in the machines to store the GPS data, and so on. The GPS devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

The GPS devices 104 may send GPS data to the system 102 via the network 106. The system 102 is caused to analyze the GPS data associated with the automobile trip for driver profiling. In an embodiment, the GPS data may be sent to the system 102 upon completion of the trip. Alternatively, the GPS data may be sent to the system 102 upon elapse of predefined time period. For instance the GPS data may be sent to the system 102 after every one hour during the trip. An example implementation of the system 102 for driver profiling is described further with reference to FIG. 2.

Figure 2:
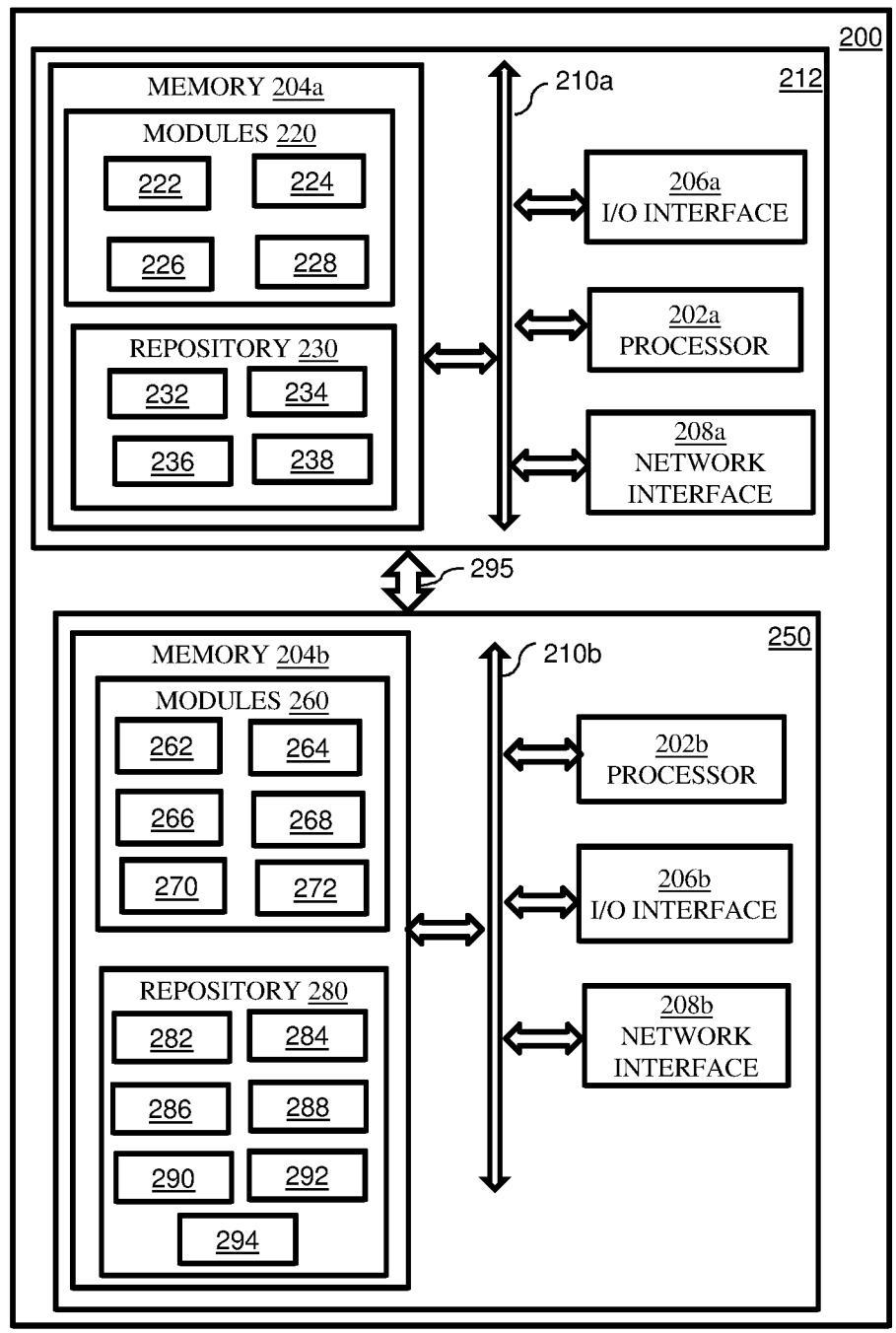
FIG. 2 is a functional block diagram of a system for driver profiling corresponding to an automobile trip, according to some embodiments of the present disclosure.

FIG. 2 illustrates a block diagram of a system 200 for driver profiling, in accordance with an embodiment of the present disclosure. The system 200 includes or is otherwise in communication with one or more hardware processors such as a processor 202a, 202b; one or more memories such as a memory 204a, 204b; user interfaces such as a user interface 206a, 206b, and a network interface unit such as a network interface unit 208a, 208b. In an embodiment, the processor 202a, the memory 204a, the user interface 206a, and the network interface unit 208a may be coupled by a system bus such as a system bus 210a or a similar mechanism.

Herein, the hardware processor 202a, the memory 204a, the UI 206a, the network interface 208a and the system bus 210a may be embodied in a GPS device, for example the GPS device 104 (of FIG. 1), and hence the hardware processor 202a, the memory 204a, the UI 206a and the network interface 208a may be collectively referred to as GPS system 212 or the system 212. Also, since the GPS system 212 is embodied in a computation device, the terms 'GPS system 212', 'system 212' and 'computation device 212' can be used interchangeably throughout the description.

The hardware processor 202b, the memory 204b, and the UI 206b may be embodied in a cloud server, for example the cloud server 108 (of FIG. 1). In an embodiment, the processor 202b, the memory 204b, the user interface 206b, and the network interface unit 208b may be coupled by a system bus such as a system bus 210b or a similar mechanism. Herein, the hardware processor 202b, the memory 204b, the user interface 206b, and the network interface unit 208b and the system bus 210b are embodied in a cloud server, and hence the hardware processor 202b, the memory 204b, the user interface 206b, and the network interface unit 208b and the system bus 210b may be collectively referred to as cloud server 250 or the system 250. The GPS system 212 and the cloud server system 250 may communicate over a communication network, for example the communication network 295. The communication network 295 is an example of the network 106 (FIG. 1).

The hardware processors 202a and/or 202b may be implemented as one or more microprocessors, microcomputers, microcontrollers, digital signal processors, central processing units, state machines, logic circuitries, and/or any devices that manipulate signals based on operational instructions. Among other capabilities, the hardware processors 202a and/or 202b are configured to fetch and execute computer-readable instructions stored in the memory 204a and/or 204, respectively.

The processor 202a/202b may include circuitry implementing, among others, audio and logic functions associated with the communication. For example, the processors 202a and/or 202b may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processors 202a and/or 202b thus may also include the functionality to encode messages and/or data or information. The processors 202a and/or 202b may include, among other things, a clock, an arithmetic logic unit (ALU) and logic gates configured to support operation of the processors 202a and/or 202b. Further, the processors 202a and/or 202b may include functionality to execute one or more software programs, which may be stored in the memories 204a and/or 204b or otherwise accessible to the processor 202a and/or 202b.

The I/O interfaces 206a and/or 206b may include a variety of software and hardware interfaces, for example, a web interface, a graphical user interface, and the like. Further, the I/O interface 206a and/or 206b may enable the system 212 and 250, respectively to communicate with other computation devices, such as web servers and external data servers (not shown), and amongst each other. The I/O interfaces 206a and/or 206b may facilitate multiple communications within a wide variety of networks and protocol types, including wired networks, for example, LAN, cable, etc., and wireless networks, such as WLAN, cellular, or satellite. The I/O interfaces 206a and/or 206b may include one or more ports for connecting a number of devices to one another or to another server.

The memories 204a and/or 204b may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In an embodiment, the memory 204a includes a plurality of modules 220 and a repository 230 for storing data processed, received, and generated by one or more of the modules. The modules 220 may include routines, programs, objects, components, data structures, and so on, which perform particular tasks or implement particular abstract data types. In one implementation, the modules 220 may include a GPS data logging module 222, a query module 224, a first feature computation module 226, and other modules 228. The modules 220 may also include programs or coded instructions that supplement applications and functions of the system 212.

The repository 230, amongst other things, includes a system database 232 and other data 234. The other data 234 may include data generated as a result of the execution of one or more modules in the other modules 210. The repository 230 is further configured to include logged GPS data 236 and a first set of features 236 computed at the system 212. The GPS data 236 and a first set of features 236 are described further in the description.

In an embodiment, the memory 204b includes a plurality of modules 260 and a repository 280 for storing data processed, received, and generated by one or more of the modules. The modules 260 may include routines, programs, objects, components, data structures, and so on, which perform particular tasks or implement particular abstract data types. In one implementation, the modules 260 may include a feature ranking module 262, a GPS data receiving module 264, a query module 266, a second feature computation module 268, a driver profile identification module 270 and other modules 272. The other modules 272 may include programs or coded instructions that supplement applications and functions of the system 250.

The repository 280, amongst other things, includes a system database 282 and other data 284. The other data 284 may include data generated as a result of the execution of one or more modules in the other modules 260. The repository 280 is further configured to include GPS data 286 associated with previous trips, GPS data 288 for the trip, a second set of features 292 computed at the system 250, and a cluster data 294. The GPS data 286, GPS data 288, the second set of features 292, and the cluster data 294 are described further in the description.

The memories 204a and/or 204b may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memories 204a and/or 204b may be configured to store information, data, applications, instructions or the like for enabling the systems 210 and 250, respectively to carry out various functions in accordance with various example embodiments. Additionally or alternatively, the memory 204 may be configured to store instructions which when executed by the processors 202a and/or 202b causes the systems 210 and 250 to behave in a manner as described in various embodiments.

Herein, the memory for example the memory and the computer program code configured to, with the hardware processor for example the processor, causes the respective system to perform various functions described herein under. For example, the memory for example the memory 204a and the computer program code configured to, with the hardware processor for example the processor 202a, causes the system 212 to perform various functions described herein under. Also, the memory for example the memory 204b and the computer program code configured to, with the hardware processor for example the processor 202b, causes the system 250 to perform various functions described herein under.

The system 212 is caused to acquire GPS data, via the network interface unit 208a. In an example embodiment, the system 212 may include a GPS receiver for acquiring the GPS data. In another embodiment, the system 212 may be embodied in a communication device, for example, a smartphone that can be utilized for acquiring the GPS data. In an embodiment, the communication device may include hardware and software that may be collectively be configured to host an IT application for acquiring the GPS data. In an embodiment, the system 212 is caused to log the acquired GPS data. For example, the GPS data logging module 222 of the system 212 logs the GPS data 236. Alternatively, the GPS data can be logged in the memory 204a of the system 212.

In an embodiment, the system 212 is caused to initiate acquiring the GPS data on detection of a start event of the trip till an end of the trip. In an embodiment, the system 212 may be caused to detect an automobile start event if GPS speed is greater than or equal to a predetermined threshold value of said speed. In an example embodiment, the predetermined threshold value of GPS speed may be 3 m/s. Additionally or alternatively, the system 212 may be caused to consider a trip of duration more than a predetermined value of trip duration as a valid trip for logging the GPS data therefor. For instance, a trip determined to be less than 20 s duration may be discarded and not considered as a valid trip. In an embodiment, the system 212 is caused to tag the GPS data acquired by an identifier that is indicative of the automobile associated with the system 212.

The GPS device communicates the GPS data to the system 250 via the communication network 295. In an embodiment, the system 250 may be embodied in or is in communication with the cloud server, for example the cloud server 108 (FIG. 1). In an embodiment, the communication network may be an example of the network 106 (FIG. 1). In an embodiment, the system 212 is caused to communicate the GPS data to the system 250 upon completion of the trip. Alternatively, the GPS data may be sent to the system 250 upon elapse of predefined time period. For instance the GPS data may be sent to the system 250 after every one hour during the trip. In another embodiment, the GPS data may determine the event out of the, predetermined time period and completion of the trip, whichever is associated with lesser time to communicate the GPS data to the system 250.

The system 250 is caused to store the GPS data 288 for the trip in the repository 280. For instance, the GPS data 288 may include the latitude, longitude, heading, altitude, timestamp, speed associated with the trip. In an embodiment, in case of multiple trips, the GPS data 288 for multiple trips may be segregated based on time duration between end event of previous trip and start event of subsequent trip by the automobile. In an example embodiment, said time duration mat be around three minutes. In addition, the repository 280 is caused to store the GPS data 286 associated with previously completed trips of the automobile. Herein, the previously complete trips corresponding to an automobile refers to the trips completed by a plurality of drivers associated with said automobile. For instance, for a personal automobile or a family automobile, three to four driver profiles may be associated with the automobile. However, for a commercial automobile 10-15 driver profiles may be associated with the automobile as these many drivers may be driving that particular automobile at different times The system 212 and the system 250 are caused to selectively compute a plurality of features associated with the trip based on the GPS data of the trip. In an embodiment, each of the system 212 and the system 250 may include a computation module, for example the first computation module 226 and the second computation module 268, respectively to compute the plurality of features associated with the trip. In an embodiment, the system 250 is caused to perform computationally complex feature computations while the system 212 is caused to perform relatively less computationally complex feature computations. In an embodiment, the computational complexity level of the plurality of features is determined at the system 250. In an embodiment, the system 250 is caused to assign a ranking to the plurality of features in order of computational complexity level thereof. Based on said ranking, the plurality of features may be categorized into a first set of features and a second set of features such that the first set of features may be associated with relatively less computation complexity as compared to the computation complexity of the second set of features. In an embodiment, the system 250 includes the feature ranking module 262 to determine the computational complexity level of the plurality of features. In an embodiment, the memory 204b may include a feature configuration data 290 having routines and/or algorithms and/or models to compute features from the GPS data. Additionally, the feature configuration data 290 includes a sorted feature list having the plurality of features sorted in order of computational complexity thereof. In addition to computing the second set of features, the system 250 is caused to compute the derived data and the multiple derivatives primary data and the derived data.

In an embodiment, the computation of features associated with GPS data includes computation of a statistical data for the plurality of attributes of the GPS data. As previously described, the plurality of attributes includes primary data such as speed, acceleration and course associated with the trip; derived data such as Jerk data, lateral acceleration, angular speed, and jerk energy associated with the trip; and multiple derivatives of the primary data and the derived data. In an embodiment, the statistical data includes a plurality of statistical parameters associated with the plurality of attributes of the GPS data. For example, the plurality of statistical parameters includes mean, median, skewness, kurtosis, standard deviation, max, min, 97.5th percentile, Q3, Q1, and 2.5th percentile. Herein, the statistical data of the plurality of attributes forms the plurality of features associated with the GPS data of the trip. Some examples of the features may include, but are not limited to, Median of speed, Q1 of 1st difference of lateral acceleration, Kurtosis of 2nd difference of jerk energy, 2.5th percentile of 2nd difference of jerk energy, and so on.

As previously described, the system 212 and the system 250 are caused to selectively compute the plurality of features based on a ranking assigned to said features, wherein the ranking is assigned based on a computational complexity of said features. The features that are associated with higher computational complexity are computed at the system 250 as the system is associated with infrastructure capable of supporting complex computations. Conversely, as the infrastructure capability of the system 212 may not support complex computations, and hence computations involving lesser complexity are performed at the system 212.

In order to selectively compute a feature from amongst the first set of features, the system 212 is caused to determine whether one or more operational characteristics of the GPS device embodying the system 212 are within predetermined range of the operational characteristics. The one or more operational characteristics of the GPS device may include RAM usage, battery charge remaining, GPS device active usage status, and so on. An example of operational characteristics being within predetermined range may be Current RAM usage <50%, Battery charge remaining >40%, Device is not in active use (i.e. in a call, watching video, playing games for smartphone), and so on. It will be noted that the aforementioned operational characteristics and predetermined range thereof are provided for exemplary purposes, and shall not be construed as limiting to the present disclosure. In alternative embodiments, the operational characteristics and predetermined range may vary as per the application and GPS device.

On determination that the operational characteristics are within predetermined range, the system 212 is caused to query to the system 250 and determine whether said feature is computed at the system 250. For example, system 212 may resolve a query, for example, 'Is this feature already computed'. In an embodiment, the system 250 includes the feature state query module 266 to query to the system 250 and determine whether said feature is computed at the system 250. In an embodiment, prior to computation of any feature at the system 212, the system 212 queries the feature state query module 266 to determine whether the feature is already computed by the system 250, and on determination that the feature is not computed at the system 250, system 212 is caused to compute said feature. Alternately, if it is determined that said feature is already computed at the system 250, the system 212 may consider a next feature for computation, thereby facilitating in reducing computation overload on the system 212. Additionally or alternatively, the system 212 is caused to compute the first and the second derivative of each of the primary data and derived data only when said first and the second derivatives are used for feature extraction. In converse, the system 250 is caused to compute the all the first and second derivatives at the beginning of computation. Said selective computation of the features by the systems 212 and 250 facilitates in lowering RAM and storage usage thereby improving battery performance.

The feature state query module 266 is further configured to store values of the first set of features computed at the system 212. The feature state query module 266 receives information such as the trip name or ID, feature name and value pair via the communication network 295 and stores said information corresponding to specified trip into the repository 280.

The system 250 is caused to compare the plurality of features associated with the trip with the precomputed features data, and in accordance identify a driver profile from amongst the set of driver profiles corresponding to the trip. In an embodiment, the system includes the driver profile identification module 270 for identifying the driver profile associated with the trip. The driver profile identification module 270 utilizes a scoring mechanism that utilized the computed features for the trip and the precomputed features data associated with the previously completed trips. The profile identification module 270 computes said score for the plurality of driver profiles associated with the automobile, and identifies a driver profile having the maximum score as the driver profile corresponding to the trip. The assignment of score to the plurality of driver profiles and selection of a driver profile therefrom that is associated with the highest score is explained in detail below.

The system 250 is caused to perform driver profiling by first clustering the plurality of features from amongst the previously computed features associated with the set of driver profiles into a set of first clusters based on a value of said feature. It will be noted herein, that each feature of the plurality of features can be clustered into one or more first clusters from amongst the set of first clusters based on the value of said feature. Each first cluster of the set of first clusters corresponding to a feature of the plurality of features is represented by a highest value and a lowest value based of said feature. For example, a first cluster of the set of first clusters may include features having values between 'a' and t', then said first cluster can be represented as a value pair (a, b). The difference of the highest value and the lowest value of the value pair defines a distance of said first cluster. For example, in the aforementioned example, the distance of the cluster is (b-a). In an embodiment, the set of first clusters may be stored as the cluster data 294 in the repository 280.

From all the features of a driver each feature can be clustered into one or more clusters. Such clustering is done for each feature for a particular driver. In an embodiment, the profile identification module 270 clusters the plurality of features of the current trip into a set of second clusters based on a value of said feature. Each feature of the plurality of features is clustered into one or more second clusters based on the value of said feature. Each second cluster of the set of second clusters corresponding to a feature of the plurality of features is associated with a highest value and a lowest value based of said feature. A difference of the highest value and the lowest value defines the distance of said second cluster.

The profile identification module 270 omits outliers from the first set of clusters and the second set of clusters so as to obtain an optimal data set for further processing and driver profiling. As an example, the profile identification module 270 may omit 10% of entire data, which may include 5% of the lowest values and 5% of highest values of the set of first features and the set of second features. It will be understood that the outlier omission is performed for optimization of data for further computations, however, in alternative embodiments, the data set including the set of first clusters and the set of second clusters can be directly utilized for further analysis and processing.

The profile identification module 270 obtains a relative variation between the one or more second clusters and the one or more first clusters based on the distance of the first cluster and the distance of the second cluster. The profile identification module 270 obtains a set of relevant features from amongst the plurality of features based on a comparison of the relative distance of each feature of the plurality of features with a threshold value of relative distance.

As an example, let x denotes the value of a feature (after outlier omission) for a driver profile. Then let for that driver profile there are 'm' clusters for feature 'x'. The 'm' clusters are the set of second clusters for the driver profile in consideration.

Let there be 'n' clusters for feature 'x' when all values of feature are considered. This implies that n clusters are the set of second clusters, (i.e. for the plurality of driver profiles). Herein m,n>=1.

It will be understood that the set of second clusters are global clusters, not dependent on any particular driver profile, and are same for the plurality of driver profiles. As previously described, a cluster is denoted by an ordered pair (a, b); b>a Where 'a' is the lowest value of feature in that cluster, and 'b' be the highest value of feature in that cluster. So, there are m such ordered pairs for each driver profile, and 'n' such ordered pairs for features of the plurality of driver profiles. Since data for all drivers include each driver surely m of such clusters is included in n clusters.

For driver profile identification, the relative variation between the one or more second clusters and the one or more first clusters is determined based on the distance of said clusters. For example, cluster variation of i-th cluster (i=1:m) may be determined as follows. Let i-th cluster may be denoted by $(a_i, b_i)$, then length of said cluster can be defined as $(b_i - a_i)$. Said cluster may belong to j-th global cluster for feature x. j=1:n, let j-th cluster be denoted by $(A_j, B_j)$. Then relative variation of i-th first cluster may be determined as:

$$RV_i = (b_i - a_i)/(B_j - A_j)$$

So for m=(3.5, 4.1) and n=(4.3, 4.5)

$$RV = (4.5 - 4.3)/(3.5 - 5)$$

Sum of $RV_i$ may be denoted by $$RV_x = \text{sum}(RV_i) \text{ for } 1 = 1:n$$

The system 250 is caused to obtain values of relative variation for each of the plurality of driver profiles (i.e., the set of second clusters) with respect to the values of the set of first clusters, and determine relevant features for each of the plurality of driver profiles. For example, for a feature x if $RV_x > 0.6$, then that feature can be discarded. Accordingly, the features having values of $RV_x = <0.6$, may be considered for selecting relevant features for a particular driver profile.

For each relevant feature of the set of relevant features, the system 250 is caused to obtain a set of driver profiles having feature value of relevant feature with a predetermined range for said relevant feature. The system 250 is then caused to identify, from amongst the set of driver profiles, the driver profile corresponding to the trip based on the relevancy score.

In an example embodiment, the system 250 may be caused to construct a feature list corresponding to each driver profile of the plurality of driver profiles, wherein the feature list includes a list of relevant features for corresponding driver profiles. For example, for a driver profile D, there may be k relevant features. If out of these, l feature values falls in predetermined range, the relevancy score for driver D may be l/k. The system 250 is caused to compute the relevancy score for the plurality of driver profiles. The system may be caused to identify a driver profile from the plurality of driver profiles as the driver profile associated with the trip based on the relevancy score. For example the driver profile associated with maximum relevancy score may be identified as the driver profile of the driver driving the automobile during the trip. In an embodiment, the system 250 is caused to store the identified driver profile corresponding to the trip, a feature subset corresponding to the driver profile, and the relevancy score computed for the trip corresponding to the driver profile, in the repository 280.

Herein, an advantage of storing the information such as the identified driver profile, relevancy score and the feature subset corresponding to the trip is that said information gets updated in the repository 280 and can be accessed or taken into consideration when next trip is to be analyzed. Accordingly, the disclosed system dynamically adjusts with each incoming data associated with automobile trips. In an embodiment, further analytics/API can be configured and results be published by utilizing the information stored in the repository. Said results can be accessed using API calls and web based interface towards driver behavior classification and trip level aberration detection. An example of driver profile identification based on the disclosed embodiments is described further with reference to FIG. 5.

Figure 3:
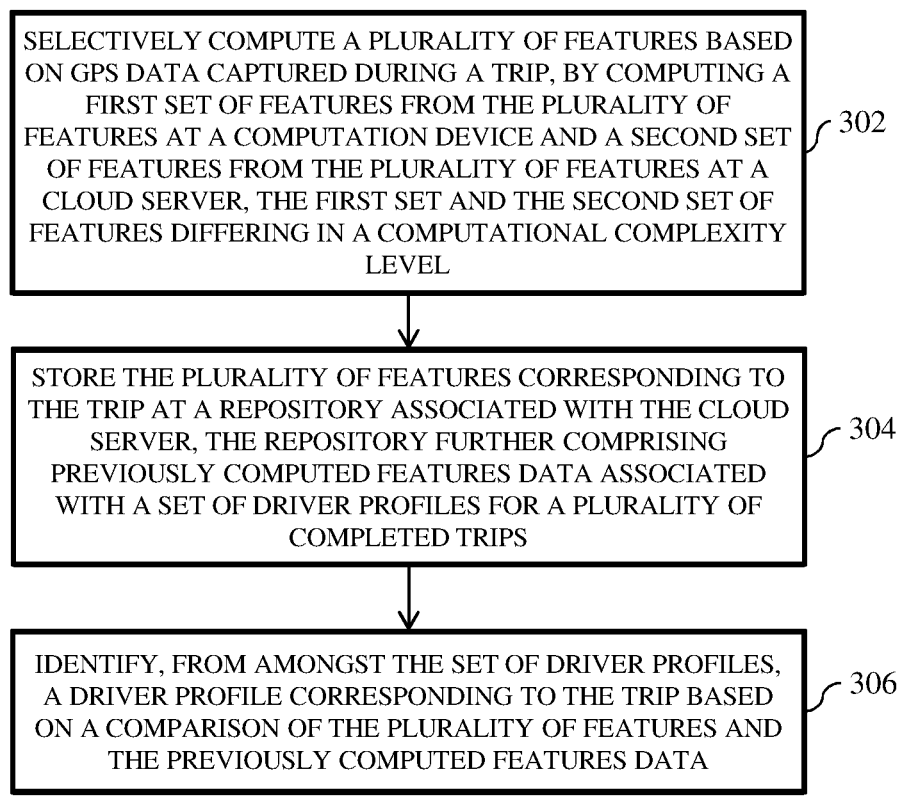
FIG. 3 illustrates a flow diagram of a method for driver profiling corresponding to an automobile trip, in accordance with some embodiments of the present disclosure.

FIG. 3 illustrates a flow diagram of a method 300 for driver profiling, in accordance with the present disclosure. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communication network. The order in which the method 300 is described is not intended to be construed as a limitation, and any number of the described method blocks can be combined in any order to implement the method 300, or an alternative method. Furthermore, the method 300 can be implemented in any suitable hardware, software, firmware, or combination thereof. In an embodiment, the method 300 depicted in the flow chart may be executed by a system, for example, the system(s) 212 and 250 of FIG. 2.

At 302, the method 300 includes selectively computing, based on GPS data captured during a trip, a plurality of features. Herein, selectively computing includes computing a first set of features from the plurality of features at the computation device and a second set of features from the plurality of features at a cloud server. The first set and the second set of features differs in a computational complexity level thereof. The plurality of features includes statistical data for a plurality of attributes of GPS data associated with the trip.

At 304, the method 300 includes storing the plurality of features corresponding to the trip at a feature database of the cloud server, the feature database further comprising pre-computed features data associated with a set of driver profiles for a plurality of completed trips.

At 306, the method 300 includes identifying, from amongst the set of driver profiles, a driver profile corresponding to the trip based on a comparison of the plurality of features and the precomputed features data. A detailed method for identifying the driver profile corresponding to the trip is explained further with reference to FIG. 4.

Figure 4:
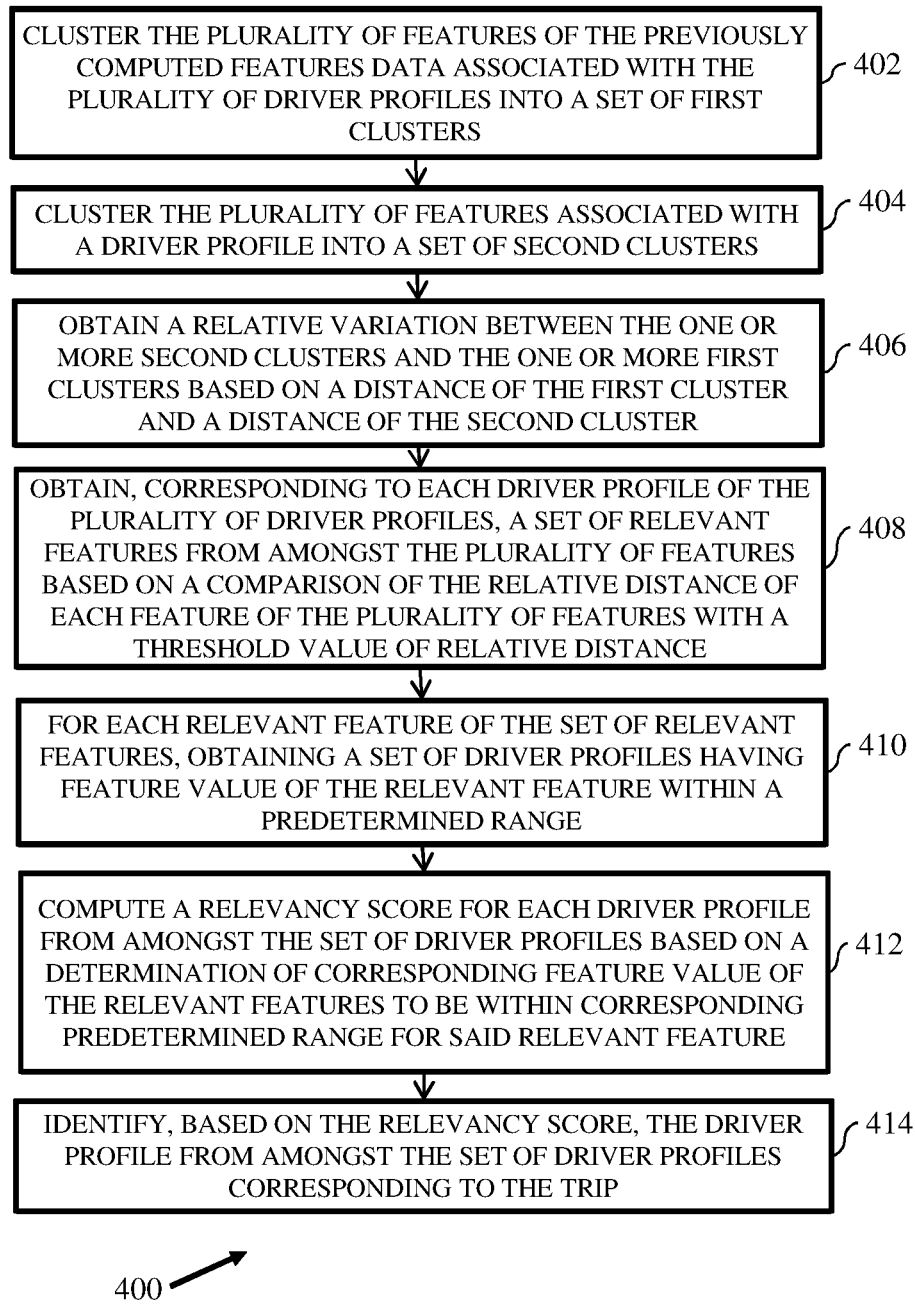
FIG. 4 illustrates a flow diagram of a method for driver profiling corresponding to an automobile trip, according to some embodiments of the present disclosure.

FIG. 4 illustrates a flow diagram of a method 400 for identifying a driver profile corresponding to a trip for driver profiling, in accordance with the present disclosure. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communication network. The order in which the method 400 is described is not intended to be construed as a limitation, and any number of the described method blocks can be combined in any order to implement the method 400, or an alternative method. Furthermore, the method 400 can be implemented in any suitable hardware, software, firmware, or combination thereof. In an embodiment, the method 400 depicted in the flow chart may be executed by a system, for example, the system(s) 212 and 250 of FIG. 2.

At 402, the method 400 includes clustering the plurality of features of the previously computed features data associated with the plurality of driver profiles into a set of first clusters. Each feature of the plurality of features is clustered into one or more first clusters from amongst the plurality of first clusters based on a value of said feature. Each first cluster of the plurality of first clusters corresponds to a feature of the plurality of features associated with a highest value and a lowest value based of said feature, such that a difference of the highest value and the lowest value defines a distance of said first cluster.

From all the features of a driver each feature can be clustered into one or more clusters. Such clustering is done for each feature for a particular driver. At 404, the method 400 includes clustering the plurality of features associated with a driver profile into a set of second clusters. Each feature of the plurality of features is clustered into one or more second clusters based on a value of said feature. Each second cluster of the set of second clusters corresponds to a feature of the plurality of features associated with a highest value and a lowest value based of said feature. A difference of the highest value and the lowest value defining a distance of said second cluster. In an embodiment, outliers may be omitted from the first set of clusters and the second set of clusters so as to obtain an optimal data set for further processing and driver profiling.

At 406, the method 400 includes obtaining a relative variation between the one or more second clusters and the one or more first clusters based on the distance of the first cluster and the distance of the second cluster. At 408, the method 400 includes obtaining, corresponding to each driver profile of the plurality of driver profiles, a set of relevant features from amongst the plurality of features based on a comparison of the relative distance of each feature of the plurality of features with a threshold value of relative distance. At 410, the method 400 includes for each relevant feature of the set of relevant features, obtaining a set of driver profiles having feature value of the relevant feature within a predetermined range. At 412, the method 400 includes computing a relevancy score for each driver profile from amongst the set of driver profiles based on a determination of corresponding feature value of the relevant features to be within corresponding predetermined range for said relevant feature. At 414, the method 400 includes identifying, based on the relevancy score, the driver profile from amongst the set of driver profiles corresponding to the trip.

Figure 5:
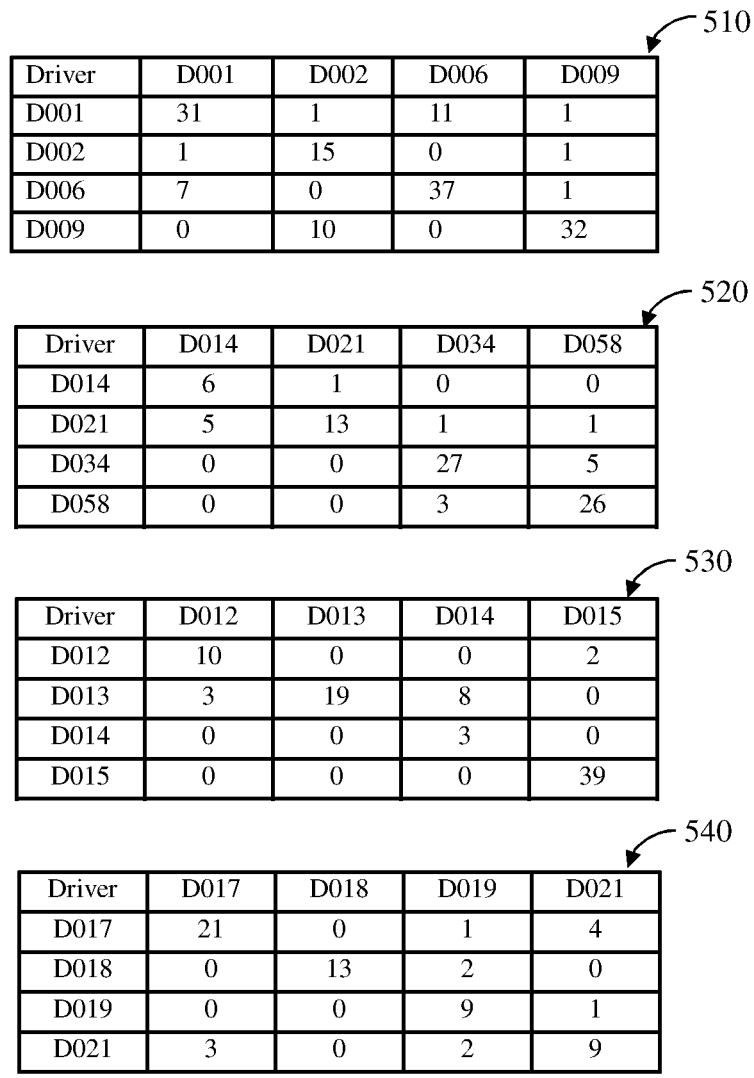
FIG. 5 illustrates an example of driver profile identification, in accordance with some embodiments of the present disclosure.

FIG. 5 illustrates example of driver profile identification, in accordance with an example embodiment. Herein, for conducting the driver profiling, a set of drivers is considered. Each of the driver is associated with a corresponding driver profiles, and the driver profiles for the set of drivers are stored in a repository, for example the repository 280 of FIG. 2. For various trips made by said drivers, a confusion matrix is obtained. As is already understood in the art, in the field of machine learning and specifically the problem of statistical classification, a confusion matrix, also known as an error matrix, is a specific table layout that allows visualization of the performance of an algorithm, typically a supervised learning one (in unsupervised learning it is usually called a matching matrix). Each column of the matrix represents the instances in a predicted class while each row represents the instances in an actual class (or vice versa). Examples of said confusion matrices 510, 520, 530, 540, are illustrated with reference to FIG. 5.

An observation of the confusion matrices obtained by driver profiling system is that in confusion matrix 510, the values at matrix locations 21 (meaning thereby, cell at row-2, column-1) 12 (meaning thereby, the cell at row-1, column-2) are both '1' (hence, are same), thereby indicating that disclosed system is capable of detecting the similar correlation for driver profiles that may be determined to have similar driving behavior. Also for confusion matrices 520, 530, 540, most of non-diagonal values are zero, thereby indicating that the disclosed system is robust in determining driving patterns or characteristics corresponding to distinct driving profiles.

Various embodiments disclosed herein provide method and system for driver profiling corresponding to an automobile trip. Herein, the embodiments disclose utilizing cloud based infrastructure for computation of features from GPS data, and accordingly identification of driver driving an automobile during a particular trip. Since the embodiments relies primarily on GPS data for processing and driver detection (and precludes need for various other sensors), a significant cost advantage is achieved over conventional systems. Another significant outcome of disclosed embodiments is that the computations are selectively performed at (1) a computation device such as a GPS logger that can be placed in a moving vehicle arbitrary orientation, and (2) a cloud server for most of computationally complex computations, thereby enabling dynamic memory and RAM usage. Moreover, selective computations facilitates in reducing computation load on the computation devices such as the GPS logger. Additionally, the embodiments disclose a systematic feature extraction approach from GPS data using statistical approach and evaluation of feature efficiency, thereby providing a robust mechanism to characterize driving style drivers, as explained with reference to FIG. 5.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for driver profiling corresponding to an automobile trip, the method comprising:
selectively computing, based on Global Positioning System (GPS) data captured during a trip, a plurality of features via a first hardware processor and a second hardware processor, wherein selectively computing comprises computing a first set of features from the plurality of features at a computation device and a second set of features from the plurality of features at a cloud server, the plurality of features comprising statistical data for a plurality of attributes computed from the GPS data associated with the trip;
storing, via the first hardware processor and the second hardware processor, the plurality of features corresponding to the trip at a repository associated with the cloud server, the repository further comprising previously computed features data associated with a set of driver profiles for a plurality of completed trips; and
identifying, from amongst the set of driver profiles, a driver profile corresponding to the trip based on a comparison of the plurality of features and the previously computed features data, via the first hardware processor and the second hardware processor, wherein identifying the driver profile based on the comparison comprises:

clustering the plurality of features of the previously computed features data associated with the plurality of driver profiles into a set of first clusters, wherein each feature of the plurality of features clustered into one or more first clusters from amongst the plurality of first clusters based on a value of said feature, each first cluster of the plurality of first clusters corresponding to a feature of the plurality of features associated with a highest value and a lowest value based of said feature, and wherein a difference of the highest value and the lowest value defines a distance of said first cluster;

clustering the plurality of features associated with a driver profile into a set of second clusters, wherein each feature of the plurality of features clustered into one or more second clusters based on a value of said feature, each second cluster of the set of second clusters corresponding to a feature of the plurality of features associated with a highest value and a lowest value based of said feature, and wherein a difference of the highest value and the lowest value defines a distance of said second cluster;

obtaining a relative variation between the one or more second clusters and the one or more first clusters based on the distance of the first cluster and the distance of the second cluster;

obtaining, corresponding to each driver profile of the plurality of driver profiles, a set of relevant features from amongst the plurality of features based on a comparison of the relative distance of each feature of the plurality of features with a threshold value of relative distance;

for each relevant feature of the set of relevant features, obtaining a set of driver profiles having feature value of the relevant feature within a predetermined range;

computing a relevancy score for each driver profile from amongst the set of driver profiles based on a determination of corresponding feature value of the relevant features to be within corresponding predetermined range for said relevant feature; and identifying, based on the relevancy score, the driver profile from amongst the set of driver profiles corresponding to the trip.

2. The method of claim 1, wherein the plurality of attributes comprises a primary data captured during the trip, a derived data derived from the primary data, and multiple derivatives of the primary data and the derived data.

3. The method of claim 2, wherein the primary data comprises speed, acceleration and course associated with the trip.

4. The method of claim 1, wherein the derived data comprises Jerk data, lateral acceleration, angular speed, and jerk energy associated with the trip.

5. The method of claim 1, further comprising storing the first set of features at a repository associated with the computation device.

6. The method of claim 1, further comprising assigning a rank to each feature of the plurality of features based on a level of computational complexity associated with computation of said feature, and wherein the level of computational complexity of the first set of features is lower than a level of the computational complexity of the second set of features.

7. The method of claim 5, wherein selectively computing the first set of features at the computation device comprises:

checking whether one or more operational characteristics of the computation device are within predetermined range of the operational characteristics;

on determining the operational characteristics to be within the predetermined range, querying to the cloud server for each feature of the first set of features to determine whether said feature is computed at the cloud server; and computing said feature at the computation device on determination that the feature is not computed at the cloud server.

8. The method of claim 2, further comprising computing the derived data and the multiple derivatives of the primary data and the derived data at the cloud server.

9. The method of claim 1, wherein the statistical data comprises a plurality of statistical parameters associated with the plurality of attributes of the GPS data, the plurality of statistical parameters comprising mean, median, skewness, kurtosis, standard deviation, max, min, 97.5th percentile, Q3, Q1, 2.5th percentile.

10. The method of claim 1, further comprising omitting outliers from the first set of clusters and the second set of clusters prior to obtaining the relative variation between the one or more second clusters and the one or more first clusters.

11. The method of claim 10, further comprising, storing in the repository of the cloud server, the driver profile corresponding to the trip and a feature subset corresponding to the driver profile.

12. A system for driver profiling corresponding to an automobile trip, the system comprising:

a first memory associated with a computation device and a second memory associated with a cloud server for storing instructions; and a first hardware processor coupled to the first memory and a second hardware processor coupled to the second memory, wherein said first and second hardware processors are configured by said instructions to:

selectively compute, based on GPS data captured during a trip, a plurality of features, wherein selectively computing comprises computing a first set of features from the plurality of features at the computation device and a second set of features from the plurality of features at the cloud server, the plurality of features comprising statistical data for a plurality of attributes computed from the GPS data associated with the trip, wherein the plurality of attributes comprises a primary data captured during the trip, a derived data derived from the primary data, and multiple derivatives of the primary data and the derived data;

store the plurality of features corresponding to the trip at a repository associated with the cloud server, the repository further comprising previously computed features data associated with a set of driver profiles for a plurality of completed trips; and identify, from amongst the set of driver profiles, a driver profile corresponding to the trip based on a comparison of the plurality of features and the previously computed features data, wherein to identify the driver profile based on the comparison, the one or morn hardware processors are further configured by the instructions to:

cluster the plurality of features of the previously computed features data associated with the plurality of driver profiles into a set of first clusters, wherein each feature of the plurality of features clustered into one or more first clusters from amongst the plurality of first clusters based on a value of said feature, each first cluster of the plurality of first clusters corresponding to a feature of the plurality of features associated with a highest value and a lowest value based of said feature, and wherein a difference of the highest value and the lowest value defines a distance of said first cluster;

cluster the plurality of features associated with a driver profile into a set of second clusters, wherein each feature of the plurality of features clustered into one or more second clusters based on a value of said feature, each second cluster of the set of second clusters corresponding to a feature of the plurality of features associated with a highest value and a lowest value based of said feature, and wherein a difference of the highest value and the lowest value defines a distance of said second cluster;

obtain a relative variation between the one or more second clusters and the one or more first clusters based on the distance of the first cluster and the distance of the second cluster;

obtain, corresponding to each driver profile of the plurality of driver profiles, a set of relevant features from amongst the plurality of features based on a comparison of the relative distance of each feature of the plurality of features with a threshold value of relative distance;

for each relevant feature of the set of relevant features, obtain a set of driver profiles having feature value of the relevant feature within a predetermined range;

compute a relevancy score for each driver profile from amongst the set of driver profiles based on a determination of corresponding feature value of the relevant features to be within corresponding predetermined range for said relevant feature; and identify, based on the relevancy score, the driver profile from amongst the set of driver profiles corresponding to the trip.

13. The system of claim 12, wherein the first hardware processors and the second hardware processor are configured by said instructions to assign a rank to each feature of the plurality of features based on a level of the computational complexity associated with computation of said feature, and wherein the level of computational complexity of the first set of features is lower than a level of the computational complexity of the second set of features.

14. The system of claim 12, wherein to selectively compute the first set of features at the computation device, wherein the first hardware processors and the second hardware processor are configured by said instructions to:
check whether one or more operational characteristics of the computation device are within predetermined range of the operational characteristics;
on determining the operational characteristics to be within the predetermined range, query to the cloud server for each feature of the first set of features to determine whether said feature is computed at the cloud server; and
compute said feature at the computation device on determination that the feature is not computed at the cloud server.

15. The system of claim 13, wherein the first hardware processors and the second hardware processor are configured by said instructions to compute the derived data and the multiple derivatives of the primary data and the derived data at the cloud server, and wherein the statistical data comprises a plurality of statistical parameters associated with the plurality of attributes of the GPS data, the plurality of statistical parameters comprising mean, median, skewness, kurtosis, standard deviation, max, min, 97.5th percentile, Q3, Q1, 2.5th percentile.

16. The system of claim 12, wherein the first hardware processors and the second hardware processor are configured by said instructions to omit outliers from the first set of clusters and the second set of clusters prior to obtaining the relative variation between the one or more second clusters and the one or more first clusters.

17. The system of claim 16, wherein the first hardware processors and the second hardware processor are configured by said instructions to store in the repository of the cloud server, the driver profile corresponding to the trip and a feature subset corresponding to the driver profile.

18. A non-transitory computer-readable medium having embodied thereon a computer program for executing a method for driver profiling corresponding to an automobile trip, the method comprising:
selectively computing, based on GPS data captured during a trip, a plurality of features via a first hardware processor and a second hardware processor, wherein selectively computing comprises computing a first set of features from the plurality of features at a computation device and a second set of features from the plurality of features at a cloud server, the plurality of features comprising statistical data for a plurality of attributes computed from the GPS data associated with the trip;
storing, via the first hardware processor and the second hardware processor, the plurality of features corresponding to the trip at a repository associated with the cloud server, the repository further comprising previously computed features data associated with a set of driver profiles for a plurality of completed trips; and
identifying, from amongst the set of driver profiles, a driver profile corresponding to the trip based on a comparison of the plurality of features and the previously computed features data, via the first hardware processor and the second hardware processor, wherein identifying the driver profile based on the comparison comprises:
clustering the plurality of features of the previously computed features data associated with the plurality of driver profiles into a set of first clusters, wherein each feature of the plurality of features clustered into one or more first clusters from amongst the plurality of first clusters based on a value of said feature, each first cluster of the plurality of first clusters corresponding to a feature of the plurality of features associated with a highest value and a lowest value based of said feature, and wherein a difference of the highest value and the lowest value defines a distance of said first cluster;
clustering the plurality of features associated with a driver profile into a set of second clusters, wherein each feature of the plurality of features clustered into one or more second clusters based on a value of said feature, each second cluster of the set of second clusters corresponding to a feature of the plurality of features associated with a highest value and a lowest value based of said feature, and wherein a difference of the highest value and the lowest value defines a distance of said second cluster;

obtaining a relative variation between the one or more second clusters and the one or more first clusters based on the distance of the first cluster and the distance of the second cluster;

obtaining, corresponding to each driver profile of the plurality of driver profiles, a set of relevant features from amongst the plurality of features based on a comparison of the relative distance of each feature of the plurality of features with a threshold value of relative distance;

for each relevant feature of the set of relevant features, obtaining a set of driver profiles having feature value of the relevant feature within a predetermined range;

computing a relevancy score for each driver profile from amongst the set of driver profiles based on a determination of corresponding feature value of the relevant features to be within corresponding predetermined range for said relevant feature; and identifying, based on the relevancy score, the driver profile from amongst the set of driver profiles corresponding to the trip.

* * * * *